United States Patent Office 3,234,027
Patented Feb. 8, 1966

3,234,027
CONTINUOUS-MIX BREAD MANUFACTURE
Earl C. Jertson, Trenton, N.J., and Elmer F. Glabe, Chicago, Ill., assignors to Marine Colloids, Inc., New York, N.Y., a corporation of Delaware
No Drawing. Filed Oct. 18, 1962, Ser. No. 231,582
5 Claims. (Cl. 99—91)

This invention relates to bread making, and more particularly to improvements in the continuous manufacture of bread, usually referred to in the industry as "continuous-mix operation bread."

Up to the discovery of continuous bread making operations the conventional method of making bread consisted briefly of preparing a sponge dough of flour, water, yeast and yeast food. This is fermented for four to five hours during which time the yeast produces certain fermentation products which it has been found are responsible for a large part of the flavor of the resulting loaf of bread. The sponge dough is returned to the mixer, where it is mixed with additional flour and water, salt, sugar, lard and non-fat dry milk. The latter ingredient has generally been used to fortify the bread at the rate of approximately 4% to 6% based on the total weight of flour. It also furnishes a substantial amount of taste to the loaf of bread. The flavor apparently blends very well with the products of fermentation to give a loaf having an all around satisfying flavor. However, it has been known for many years that non-fat dry milk, if used at levels over about 5% to 6% in conventional sponge dough bread, produces certain untoward loaf effects.

In the countinuous-mix bread operations the sponge fermentation step is completely eliminated. A broth or "brew" is prepared in a tank. A typical "brew" generally consists of water, sugar, yeast, yeast nutrients, buffering agents and vitamin enrichment agents. A small amount of non-fat dry milk is usually included. This broth is fermented for about 2½ hours at approximately 86° to 93° F. At the end of this period the broth is pumped to a blender or special incorporator where it is mildly mixed with flour, fat and oxidizing agents in desired proportions. Mixing is on a continuous basis. This loosely mixed batter is then pumped directly to a special mixer where the dough is forced through a relatively narrow aperture within which an agitator is operating at high speed. The result of this operation is to thoroughly incorporate all the ingredients and, more important, to completely hydrate and develop the protein or gluten of the flour such that a dough structure is formed within 30 to 80 seconds. This step completely replaces the slow hydration of gluten or protein of the flour occurring during the four- to five-hour fermentation step in conventional sponge dough bread. The dough or batter is then immediately extruded directly into bread pans. These are transferred to a conventional proof box operating at approximately 100° F. and 95% relative humidity. After proofing or rising for about one hour, the pans are transferred to a standard baking oven and baked for about 25 minutes. Removal from the pan, cooling, slicing, and wrapping follow in order. The Baker Patent No. 2,953,460 contains a more detailed exposition of the continuous-mix bread making operation and the respects as to which it is uniquely different and distinct from the batch processes that previously had been used.

Continuous-mix bread has a very fine close-grained, silky texture, but it is very low on flavor. The reason for this low flavor value stems from two sources. The first is the fact that the continuous-mix process does away with the long fermentation period wherein the flour and other ingredients are acted upon by the yeast and the products of yeast fermentation. The second is the lack of non-fat dry milk. It has been found over several years of operations that continuous-mix bread will not stand high levels of non-fat dry milk. Whereas the conventional sponge dough process bread contains on the average about 4% to 6% non-fat dry milk, the continuous-mix bread currently made and sold contains less than 1%. This has been the experience and shortcoming that has been encountered in the numerous continuous-mix plants that have gone into operation in the United States.

Commercial practice has demonstrated that any attempt to increase the non-fat dry milk level over 1% generally results in bread with exceedingly low volume and very weak side walls. When such bread containing 3% or 4% of milk is put through the slicing and wrapping procedures, the result is loaves of bread which develop concave sides along with very low loaf volume and, therefore, slack-filled packages. Most bakers making use of the continuous-mix operations have been required to reduce the non-fat dry milk level to 1% or lower with regret since this step reduces the nutritional properties and naturally augments an already poor flavor situation. Since the continuous-mix operation is geared to short fermentation, any method by which more milk can be used would obviously benefit the taste of the bread and increase its nutritional qualities.

The decreased ability of wheat flour to "carry" an otherwise desirable quantity of non-fat dry milk when used in a continuous-mix process is believed to be linked to a difference in gluten development. In the conventional sponge dough process, during the long four- to five-hour sponge fermentation time, the gluten has a considerable period of time during which to absorb water, or "hydrate," under the influence of an ideal pH range and in the presence of carbonic acid. In the continuous process, on the other hand, the gluten hydration takes place in a few minutes under the influence of mechanical action only. It is very evident that the respective conditions of hydration are not the same and that in the continuous process the conditions are such that the presence of substantial quantities of "foreign" milk proteins appears to interpose a physico-chemical impediment in the development of the gluten matrix and to interfere with slippage of the gluten strands upon each other. In any case, regardless of theoretical considerations, the result is a less extensible dough, finally ending in a loaf of low volume or size with weak structure. Such bread will not withstand normal handling usually required in retail distribution, such as truck transportation or stacking on display shelves, without a considerable degree of collapse thereby making the bread unsalable. Moreover, in order to achieve development of the dough that is most favorable to obtaining the pore size and texture that is desired, the continuous-mix operation at best requires close control and any attempt to add more than about 1% of non-fat dry milk aggravates its sensitivity to erratic performance and makes the matter of control still more difficult.

One of the objects of the present invention is to provide a new and improved process for improving the flavor of bread made by a continuous process while retaining the other desirable properties and improving the quality of such bread.

A further object is to provide a new and improved process for incorporating non-fat dry milk into continuous-mix bread in larger quantities than heretofore feasible under normal plant operating methods.

Another object is to provide new and useful compositions. Other objects will appear hereinafter.

We have found that by the inclusion of carrageenin in the broth that is used in the continuous process for making bread the aforesaid difficulties and shortcomings that have been imposed on this art can be overcome in that one is enabled without sacrifice of loaf structure and physical properties to employ an amount of non-fat dry milk comparable to that employed in making bread of the sponge dough type and thereby obtain nutritional fortification and improved flavor that heretofore has been considered to be possible under practical operating conditions only in the case of bread of the sponge dough type.

Carrageenin is the common and usual name of an extract obtained from seaweeds falling in the botanical class of Rhodophyceae that contains more than 20%, but not more than 40%, of ester sulfate groups on a dry weight basis. Typical species which are a source of carrageenin are *Chondrus crispus*, *Chondrus ocellatus*, *Eucheuma cottonii*, *Eucheuma spinosum*, *Gigartina acicularis*, *Gigartina pistillata*, *Gigartina radula* and *Gigartina stellata* and *Iridaea laminarioides*. The extract may be obtained by either hot or cold water extraction; it may or may not be modified through the addition of acids or alkalies during the extraction process; it is a sulfated polysaccharide, the dominant hexose units of which are galactose and anhydrogalactose; it may be composed of varying amounts of two or more fractions, the dominant fractions being kappa and lambda; the separate fractions also come within the scope and meaning of the definition of carrageenin; and the term applies to all salt forms such as sodium, potassium, calcium, ammonium, etc., or any combination of two or more of these cations.

Carrageenin has been known and used for many years because of its ability to suspend cocoa particles in chocolate milk, to stabilize and prevent ice crystal growth in ice cream, and to produce milk gels for dessert pudding purposes. It likewise has been indicated experimentally that carrageenin has a modifying effect on flour proteins.

Research data shows that carrageenin possesses a very high degree of ionization and also offers many sites for possible hydrogen bonding. It is strongly anionic and negative charges occur wherever the ester sulfate groups occur. Most proteins will usually have many posiitve charges which occur at the amino groups. When these negative and positive groups tend to neutralize each other they facilitate and promote complexing and stability of the resulting product.

In the practice of the present invention the carrageenin preferably is dispersed in broth prior to continuously blending the broth with the flour for forming the dough, and under these conditions the carrageenin appears to complex reactively both with the protein of the non-fat dry milk components and with the protein of the flour so that even when present in amounts substantially greater than 1%, the non-fat dry milk components no longer interfere with the development of a gluten matrix that is comparable to that which occurs in the continuous process when the non-fat dry milk additive is less than 1% and that is comparable to that which occurs in a sponge dough batch process wherein the non-fat dry milk solids content is of the order of 4% to 6%. In addition, the enhanced sensitivity to erratic performance that otherwise results from an attempt to add more than about 1% of non-fat dry milk does not occur.

More generally, in the continuous-mix dough mixing operation, the dough ingredients are initially mixed in a so-called premixing zone wherein there is little or no development of the dough. The mixed dough is continuously moved from this mixing zone to and through a developing zone wherein with the aid of mechanical working development of the dough is accomplished in a very short time as compared with the prior sponge dough process and on a continuous basis. The development of the dough is that modification of the initially mixed materials whereby, as explained in detail in the aforesaid Baker Patent No. 2,953,460, the mixed materials acquire an elastic, strong, firm, "doughy" consistency that will properly retain the gas generated during proofing and that will provide cell walls of the desired tenderness, firmness, resilience and crumb characteristics in the finished bread loaf. The attainment of a state of development as desirable as that obtained in the sponge dough process presents the principal problem in successfully switching from the sponge dough process to the continuous-mix operation. As pointed out above, the art heretofore has been unable to do so and still obtain the benefits as regards flavor and nutritive value that result from the use of more than about 1% by weight of milk solids on the weight of the flour. According to the present invention, when the carrageenin is caused to be present in the small amounts mentioned herein it has the capacity of functioning as a development improver in the sense that it enables the dough to be brought to its desired state of development even when substantially more than 1% of milk solids on the weight of the flour is added to the dough mix.

The precise activity of the carrageenin as a development improver is not altogether understood, although it would appear to involve complexing of the carrageenin molecule by chemical reaction with both the milk protein and the flour protein whereby the milk protein no longer interferes with gluten development, but becomes integrated with the flour protein or otherwise becomes modified so that under the influence of the mechanical working and in the short time that characterizes continuous-mix dough manufacture a very satisfactory development of the dough is accomplished. That the improving function of the carrageenin is primarily chemical in nature is further indicated by the fact that the effective and optimum amounts thereof are affected by such things as the molecular weight of the carrageenin that is added, the content and nature of the flour protein and the amount of milk protein that is present. That which is optimum under one set of circumstances may be more than is desired under another set of conditions, or, on the other hand, may be less than is desired under still other conditions. However, for any particular dough formulation and continuous-mix technique that is employed it is relatively simple to determine that amount of carrageenin within the limits given which possesses the optimum effectiveness desired as an improver for the development of the dough when milk solids are included in the dough in the amounts herein mentioned.

For best results we have found that the carrageenin used should be cold-soluble in water or other aqueous media. Any carrageenin whose predominant cation is sodium has these solubility properties, as is also the case of any carrageenin extract made from seaweeds that produce a predominantly lambda carrageenin, for example *Gigartina pistillata* and *Gigartina acicularis*. We find that cold water solubility properties are highly desirable in bringing about this complexing action with the proteins of flower and milk. However, hot-soluble carrageenin may also be employed. In this case the carrageenin is first suspended in water. This suspension is then heated to solution temperature (120° F. and above), then cooled to room temperature and then used in proper proportion in the preparation of the broth. Hot-soluble carrageenin material gives best results when treated in this fashion but will also give complexing action to a somewhat lesser degree if used in the water of the broth formula without the heating step.

The invention will be further illustrated but is not limited to the following examples in which the quantities are stated in parts by weight unless otherwise indicated:

Example 1

The following is a typical bakery formula for continuous-mix process bread that has been reduced to 100 lbs. of flour basis for easy comparison:

|  | Lbs. | Ounces | P.p.m.* |
|---|---|---|---|
| Part A: Flour | 100 | | |
| Part B: Shortening | 4 | 4 | |
| Part C: | | | |
| Potassium bromate | | | 45 |
| Potassium iodate | | | 12 |
| Water | 5 | | |
| Part D: Emulsifier (may also be added with Part B) | | 4 | |
| Part E: | | | |
| Water | 58 | | |
| Liquid sucrose | 9 | | |
| Yeast food | 1 | | |
| Yeast | 3 | | |
| Salt | 2 | | |
| Buffer salts | | | 1.5 |
| Vinegar | | | 3.5 |
| Calcium propionate | | | 1.0 |
| Monocalcium propionate | | | 3.5 |
| Enrichment tablets | | | 1 |
| Non-fat dry milk | 1 | | |

*P.p.m. means parts per million.

The above parts are prepared and arranged so that they can be delivered to the continuously proportioning equipment which in turn delivers the properly proportional ingredients to the pre-mixer chamber of the continuous bread making machine. The flour (Part A) is usually held in a nearby bin; the shortening (Part B) is usually placed in a tank and heated to a liquid consistency; in Part C the oxidizing agents are predissolved in a small portion of the water; the emulsifier (Part D) may be added separately but is usually preblended with Part B.

Part E is a fermented broth which is first mixed together with about 6% of the total flour in a large tank wherein it is held at 86° F. with moderate agitation for between 1.5 and 2.5 hours, e.g. 2 hours. At the end of this holding period the broth is also continuously proportioned and delivered to the premixer chamber at a rate of about 75 pounds to each 100 pounds of flour. In the premixer the properly proportioned ingredients are mixed without pressure until they are fully wet and combined to form a substantially homogeneous lump-free dough which, however, is essentially undeveloped. From the premixer the dough is passed continuously into the developer chamber where further intensive mixing is continued under pressure until the dough is fully developed. The pressures employed according to this example range between 28 and 30 pounds per square inch and the time required to reach optimum development is about 80 to 90 seconds. The speed of the impeller (which agitates and works the dough in the developer chamber) is about 110 r.p.m. From the developer the dough is extruded into loaf size pans which then pass into the proofing room where they remain for about 60 minutes at a temperature of 100° F. and 90% humidity. After proofing, the loaves are baked, sliced, wrapped and cooled in the usual manner.

Example 2

The same formula was used as in Example 1 except that the non-fat dry milk level was increased to 4 lbs. (4% based on flour weight) and the water level was increased also by 2 lbs.

Example 3

The same formula was used as in Example 1 except that the level of non-fat dry milk was raised to 4% based on flour weight; and water was increased 2 lbs. To this broth were added 0.20 ounce, or 0.012%, based on flour weight, of a cold water soluble, predominantly lambda type carrageenin obtained from a mixture of *Gigartina pistillata* and *Gigartina acicularis*.

Example 4

The same formula was used as in Example 1 except that 6 lbs. (6% based on flour weight) of non-fat dry milk was used and water was increased 3 lbs.

Example 5

The same formula was used as in Example 1 except that the level of non-fat dry milk was raised to 6% based on flour weight; and the water was increased 3 lbs. The carrageenin product used in Example 3 was raised 0.3 oz. or 0.0182% based on flour weight.

The bread made by the formulae expressed by Examples 1 to 5 was carefully scored according to the followering schedule by three qualified bakery experts. Loaf volume was measured by determining cubic displacement. The values thus obtained were converted by applying a factor to the score value for volume shown on the following score sheet. The highest values attainable for any white bread using this scoring system appear in the left-most column for each category. The data thus obtained is set forth in the following table:

| Loaf No. | 1 | 2 | 3 | 4 | 5 |
|---|---|---|---|---|---|
| Milk content | Control plus 1% Milk | Control plus 4% Milk | Control plus 4% Milk | Control plus 6% Milk | Control plus 6% Milk |
| Percent carrageenin | 0 | 0 | .012 | 0 | .018 |
| Loaf volume (10) | 9.50 | 8.50 | 9.25 | 8.00 | 9.25 |
| Loaf shape (5) | 4.50 | 4.25 | 4.50 | 4.00 | 4.50 |
| Crust color (10) | 8.50 | 9.00 | 9.00 | 9.50 | 9.50 |
| Crust character (5) | 3.75 | 4.00 | 4.25 | 4.25 | 4.50 |
| Grain (10) | 9.00 | 8.75 | 9.25 | 8.50 | 9.25 |
| Crumb color (10) | 9.00 | 8.75 | 9.25 | 8.50 | 9.00 |
| Texture (15) | 13.25 | 13.00 | 14.25 | 12.75 | 14.50 |
| Odor (10) | 8.00 | 8.75 | 8.75 | 9.00 | 9.00 |
| Mastication (5) | 4.25 | 4.00 | 4.25 | 3.50 | 4.50 |
| Flavor (20) | 18.00 | 18.25 | 18.50 | 18.75 | 18.75 |
| Total Score (100) | 87.75 | 87.25 | 91.25 | 86.75 | 92.75 |

REMARKS

Judges' comments:

Loaves 2 and 4 showed very weak sidewalls. They crushed easily.

Loaves 3 and 5 were much more sturdy.

The data in the above table demonstrate:

(1) The characteristic drop in loaf volume and the development of poor loaf shape and interior structure when levels of 4% and 6% of milk are used in continuous-mix process bread. (Loaves 2 and 4.)

(2) The improvement in bread odor and flavor when 4% or 6% milk is used. (Loaves 2, 3, 4 and 5 versus number 1.)

(3) The improvement in loaf volume and loaf structure (shape, grain, texture) when carrageenin is used with 4% and 6% milk. (Loaves 3 and 5 versus loaves 2 and 4.)

Example 6

The same formula was used as that used in Example 3 except that the carrageenin used was a cold water soluble carrageenin obtained from *Chondrus crispus* and consisting of about equal parts of predominantly sodium lambda and predominantly sodium kappa carrageenin. The resulting bread was judged excellent. Loaf volume, shape, crust color, grain, texture, flavor and other items making a high quality bread were found to be satisfactory in every respect.

Example 7

The same formula was used as that used in Example 3 except that the carrageenin used was a cold water soluble predominantly calcium lambda carrageenin obtained from *Chondrus crispus*. The resulting bread was excellent in all respects.

Example 8

The same formula was used as that used in Example 3 except that the carrageenin used was a hot water soluble carrageenin, also obtained from *Chondrus crispus* and which was composed of about equal parts of calcium lambda and calcium kappa carrageenin. In order to obtain solubility with this type of extract, it was first dispersed in water having a temperature of about 120° F. Once solubility was obtained the other ingredients of the broth were added after which the temperature was lowered to that required for fermenting the broth (86° F.) The resulting bread was in all ways equal to that generally offered commercially.

In the practice of this invention lambda carrageenin has the advantage of being cold water soluble regardless of whether its dominant cation content is calcium, sodium or potassium. However, equally good results may also be obtained using cold water soluble kappa carrageenin, e.g., sodium kappa carrageenin. So-called "hot water" soluble carrageenin products usually are in the form of calcium kappa carrageenin or blends of calcium kappa and calcium lambda carrageenin.

It has been found that the carrageenin has substantial effectiveness for the purposes of this invention when there is as little present as about 0.01% by dry weight on the total weight of the flour. On the other hand, the amount of carrageenin should not exceed about 0.035% on the weight of the flour, but it ordinarily does not exceed about 0.025%. There is some variation as regards the optimum and maximum amounts of carrageenin that may be used in good practice of the present invention in relation to the total flour inasmuch as the amount of carrageenin that is required for a given degree of effectiveness is somewhat greater in the case of relatively high content of milk solids than it is for a relatively low content. Moreover, there is some variation in this regard depending on the protein content of the flour, the higher protein flour permitting the use of a greater amount of carrageenin. Furthermore, carrageenin products having low molecular weight as compared to high molecular weight may be employed at higher concentrations. However, as noted above, the optimum amount of carrageenin for a given bread formulation can be readily determined in accordance with the principles herein disclosed.

In the practice of this invention it is preferable to dissolve the carrageenin in the broth that contains the yeast and yeast nutrients. However, so long as the carrageenin is added in the form of an aqueous solution, it may be added either separately or in conjunction with one or more of the other water-soluble constituents of the bread formula.

By reason of the presence of the carrageenin, it is possible to make bread when using as much as about 8% of non-fat dry milk on the total weight of flour. For most purposes it constitutes preferred practice of this invention when the amount of non-fat dry milk is of the order of 4% to 6% on the total weight of flour. However, being enabled according to this invention to use lesser amounts greater than about 1%, e.g., 2% or 3%, of non-fat dry milk on the total weight of flour represents a substantial improvement in relation to prior practice of continuous-mix bread manufacture restricted to the use of less than about 1% of non-fat dry milk.

Although non-fat dry milk generally is regarded as the preferable form whereby milk values may be added to bread, whole milk powder, or liquid whole milk or skim milk may be used to give a solids level of the proteinaceous solid content of milk (proteinaceous milk solids) by dry weight equal to those mentioned hereinabove for non-fat milk solids. Milk in any of these other forms produces the same adverse effects on baked bread products that have been mentioned hereinabove with reference to non-fat dry milk, and the addition of carrageenin in the manner disclosed and exemplified hereinabove likewise is effective in overcoming these adverse effects.

The milk components may be incorporated in any suitable way. Thus while the foregoing examples illustrate inclusion in the broth, it may be incorporated in any other convenient way. For example, dried non-fat or whole milk may be fed into the pre-mixer separately or in admixture with the flour.

As regards the bakery formula that is used and the continuous-mix techniques that are used, it is to be expected that different bakeries vary them according to their individual preferences as regards consistency, quality, flavor, fortifying additives, improvers and the like. The essential elements of bread dough are flour, water and yeast. In the bread dough art and herein the term flour has reference to flour milled from wheat or rye grains and to mixtures of both. Sweetening agents and shortening contribute to flavor and likewise are fortifying agents. The sweetening agent may be, for example, sucrose or dextrose in either liquid or solid form. Salt usually is added and most bread doughs have vitamin values added thereto. One or more oxidizing agents normally are employed as well as small amounts of a buffer and an emulsifier. In making the broth that is pre-mixed and fermented, it is the current practice of some bakeries to include therein as much as about 25% by weight of the total flour. Further particulars relating to dough formulation and continuous-mix bakery techniques are contained in the aforesaid Baker Patent No. 2,953,460.

It is to be understood that the examples of the practice of this invention set forth hereinabove are for the purpose of illustrating the practice of this invention and that this invention may be practiced in other ways in accordance with the disclosure and principles herein set forth.

We claim:

1. In a continuous-mix process of making bread dough comprising flour, water and yeast wherein from about 1% to about 8% on the weight of the flour of the proteinaceous solid content of milk is included in the mix, the dough components being continuously fed into the pre-mixing zone wherein they are initially mixed and the resulting mixture is continuously fed into and through a developing zone in which the mixture is subjected to mechanical working and the developed dough is continuously discharged; the step of introducing into said pre-mixing zone an aqueous solution of carrageenin within the range of from about 0.01% to about 0.035% by dry weight on the weight of the flour as an improver for the development of the dough in said developing zone.

2. A process according to claim 1 wherein said proteinaceous solid content of milk constitutes from about 3% to about 6% by dry weight on the weight of said flour and the amount of carrageenin is from about 0.01% to about 0.025% by dry weight on the weight of said flour.

3. A process according to claim 2 wherein said flour is substantially entirely wheat flour.

4. In a continuous-mix process of making bread dough wherein an aqueous broth is prepared containing water, yeast and yeast nutrient, said broth is continuously introduced together with flour and the balance of the dough constituents, including from about 1% to about 8% of proteinaceous milk solids on the weight of the flour, into a pre-mixing zone wherein said constituents are initially mixed, and the resulting mixture is fed into and through a developing zone in which the mixture is subjected to mechanical working and from which developed dough is continuously discharged, the step of including in solution in said broth from about 0.01% to about 0.035% by dry weight of carrageenin on the total weight of the flour as an improver for the development of the dough in said developing zone.

5. A method according to claim 4 wherein said carrageenin is cold water soluble and is dissolved and brought into solution in said broth at a temperature not greater than about 120° F.

References Cited by the Examiner
FOREIGN PATENTS
532,980  11/1956  Canada.

OTHER REFERENCES

Bakers Weekly, vol. 186, No. 7, May 16, 1960 (pp. 33–36 and 74), Continuous Mix Operations Varying Nonfat Dry Milk, Swortfiguer.

Cereal Science Today, vol. 2, No. 6, July 1957 (pp. 159, 161 and 162), Effects of Irish Moss Extractive (Carrageenin) on Wheat-Flour Products, Glabe et al.

The Bakers Digest, April 1959 (pp. 81–83).

A. LOUIS MONACELL, *Primary Examiner.*

BEATRICE H. STRIZAK, *Examiner.*